United States Patent
Elsen

(10) Patent No.: US 11,439,265 B2
(45) Date of Patent: Sep. 13, 2022

(54) METHOD FOR CUTTING FRUIT, VEGETABLES OR SIMILAR, CUTTING TOOL, APPLICATOR FOR USE IN A CUTTING TOOL AND DOSING DEVICE

(71) Applicant: BÖRNER DISTRIBUTION INTERNATIONAL GMBH, Landscheid-Niederkail (DE)

(72) Inventor: Wolfgang Klaus Elsen, Speicher (DE)

(73) Assignee: BOERNER DISTRIBUTION INTERNATIONAL GMBH, Landscheid-Niederkail (DE)

( * ) Notice: Subject to any disclaimer, the term of this patent is extended or adjusted under 35 U.S.C. 154(b) by 194 days.

(21) Appl. No.: 15/036,993

(22) PCT Filed: Nov. 14, 2014

(86) PCT No.: PCT/DE2014/000584
§ 371 (c)(1),
(2) Date: Sep. 13, 2016

(87) PCT Pub. No.: WO2015/070837
PCT Pub. Date: May 21, 2015

(65) Prior Publication Data
US 2017/0007062 A1    Jan. 12, 2017

(30) Foreign Application Priority Data

Nov. 16, 2013   (DE) ................... 10 2013 019 078.9
Feb. 5, 2014    (DE) ................... 20 2014 000 963.5

(51) Int. Cl.
*A47J 17/02*    (2006.01)
*A47J 43/25*    (2006.01)
(Continued)

(52) U.S. Cl.
CPC .............. *A47J 17/02* (2013.01); *A23L 33/15* (2016.08); *A47G 21/004* (2013.01); *A47J 43/25* (2013.01);
(Continued)

(58) Field of Classification Search
CPC ....................................................... A47J 17/02
See application file for complete search history.

(56) References Cited

U.S. PATENT DOCUMENTS 2,656,600 A    10/1953  Barbee
3,816,875 A *   6/1974  Duncan .............. B26D 7/088
                                                452/149
(Continued)

FOREIGN PATENT DOCUMENTS

DE         358 629 B1     5/1919
DE         102011001853  10/2012
EP         3 068 270      1/2019

OTHER PUBLICATIONS

Arguments before EPO for claims corresponding to claims in amendment after final.

*Primary Examiner* — Stephanie A Cox
(74) *Attorney, Agent, or Firm* — Ferdinand IP Law Group, LLC

(57) ABSTRACT

The invention relates to a method for cutting fruit, vegetables or similar, to a cutting tool (1) for cutting fruit, vegetables or similar, to an applicator (8) for use in a cutting tool (1) and to a dosing device. According to the invention, a fluid is supplied to a blade (4) of a cutting tool (1), preferably a cutting edge (6) of said blade (4).

9 Claims, 7 Drawing Sheets

Figure 1:
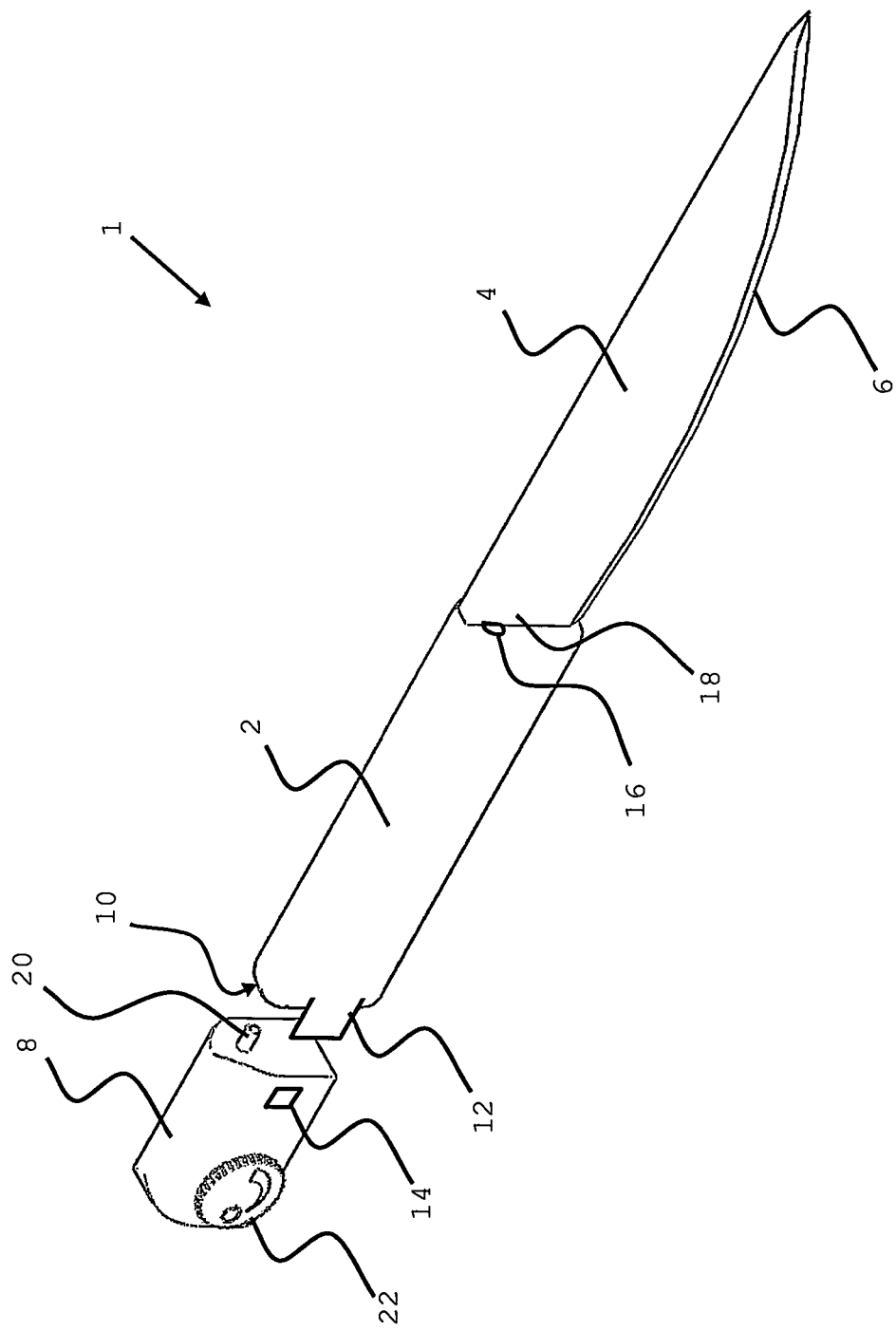

(51) Int. Cl.
   *A47G 21/00*   (2006.01)
   *B26B 11/00*   (2006.01)
   *B26D 3/28*    (2006.01)
   *B26D 7/08*    (2006.01)
   *B26D 7/27*    (2006.01)
   *A23L 33/15*   (2016.01)

(52) U.S. Cl.
   CPC .............. *B26B 11/00* (2013.01); *B26D 3/283* (2013.01); *B26D 7/088* (2013.01); *B26D 7/27* (2013.01); *A23V 2002/00* (2013.01)

(56) References Cited

U.S. PATENT DOCUMENTS

| | | | | |
|---|---|---|---|---|
| 4,807,361 A * | 2/1989 | Raczkowski | ......... | B23D 59/04 30/123.3 |
| 5,394,780 A * | 3/1995 | Foster | ...................... | B26D 3/11 83/402 |
| 5,890,630 A * | 4/1999 | Lobdell | .................. | B65D 35/36 222/192 |
| 5,894,959 A * | 4/1999 | Sigurlidason | ........ | A47G 21/005 222/192 |
| 5,899,367 A * | 5/1999 | Strength | .............. | A01K 5/0216 222/386.5 |
| 7,146,737 B2 * | 12/2006 | Boerner | .................. | A47J 43/25 30/279.2 |
| 8,051,570 B1 * | 11/2011 | Brown | ................. | A47G 21/005 222/192 |
| 9,694,944 B2 * | 7/2017 | Long | ..................... | B65D 35/08 |
| 2008/0121658 A1 * | 5/2008 | Rosner | ................. | A21C 15/005 222/158 |
| 2010/0325895 A1 * | 12/2010 | Geissler | ............... | A47G 21/004 30/123 |
| 2013/0233886 A1 * | 9/2013 | Long | ..................... | B65D 35/08 222/95 |

* cited by examiner

METHOD FOR CUTTING FRUIT, VEGETABLES OR SIMILAR, CUTTING TOOL, APPLICATOR FOR USE IN A CUTTING TOOL AND DOSING DEVICE

The present invention relates to a method and a cutting tool for cutting fruit, vegetables or the like. The cutting tool can be used particularly for chopping a material as previously defined.

As is well known, knives are used for cutting foods. It is necessary here for the knife used to have a sharp edge in order to be able to cut also through hard foods in as controlled a manner as possible or to obtain a clean cut, without crushing or squeezing soft foods. In the case of conventional, manually used kitchen knives, the blade becomes blunt with time, as a result of which the frictional effect between the knife and the food increases at the blade and there may be increased danger that the cut cannot be made as cleanly as intended.

Furthermore, devices are known, which have a cutting knife, which is held in a frame, along which the food is guided. By running it over the cutting knife, the food is cut into strips and the strip, which has been cut off, is passed through the frame and separated from the food. Such devices usually have a frictional surface, on which the food is guided to the cutting knife and over the latter under the action of contact pressure. This contact pressure also increases the effect of friction between the knife and the food.

There is therefore the desire to find a solution for cutting foods, which does not increase the frictional force produced by the cutting motion, between the cutting tool used and the material, which is to be cut.

It is an object of the invention to provide an improved solution for a method for cutting fruit, vegetables or like, a cutting tool and an applicator for use in a cutting tool, which avoids or reduces at least a portion of the known disadvantages of the prior art.

According to the invention, this objective is accomplished by means of a method of the main claim, a cutting tool of a dependent claim, as well as an applicator of a further dependent claim, as well as a metering device of a further dependent claim.

Advantageous developments, further features, and details of the present invention arise out of the dependent claims, the specification and the drawings. In this way, features and details, which have been described in conjunction with the method, obviously also apply in conjunction with the device and vice versa, so that a reciprocal reference to the individual aspects of the invention can always be made with respect to the disclosure of this invention.

The subject matter of the main claim relates to a method for cutting fruit, vegetables or the like. In accordance with the method, a fluid is supplied to a cutting edge of a cutting tool, preferably a cutting edge of the blade. The advantage thereby achieved is that the blade, which is acted upon by the fluid, has a lower friction with respect to the material being cut, since the fluid itself has a lower friction with respect to the surfaces of the material being cut and of the blade. In particular, the side surfaces of the blade have a relatively high friction with respect to the material being cut and, during a cutting motion, the fluid prevents retardation of the cutting motion as the blade continuously penetrates further into the material being cut.

The subject matter of subsequent claims relates to a cutting tool for cutting fruit, vegetables or the like. The cutting tool has a basic body, at which a blade is disposed in order to cut off pieces from the respective material, which is to be cut. Furthermore, the cutting tool has an applicator, which is to supply fluid to the blade, especially to the cutting edge of the blade.

Within the meaning of the invention, a "blade" is generally understood to be a flat body, which, in a longitudinal direction, has a ground cutting edge, which is disposed at a side edge. The blade may preferably comprise metal, ceramic or a different material with a high Rockwell hardness. The cutting edge of the blade is the sharp edge of the ground blade, which may have different shapes. The cutting edge may, for example, have a straight, curved and/or undulating shape, in order to be adapted, for example, to the individual purposes of the respective materials to be cut. For example, it may be desirable to produce a desired pattern by means of a serrated or undulating blade on the cut surface of the material being cut.

An advantage of the present invention is that the blade, which is acted upon by the fluid, has a lower friction with respect to the material being cut, since the fluid itself has a lower frictional resistance with respect to the surfaces of the material being cut and of the blade. In particular, the side surface of the blade has a relatively high friction with respect to the material being cut, and the fluid, during a cutting motion, prevents the cutting motion being retarded as the blade constantly penetrates further into the material being cut.

The subject matter of subsequent claims relates to an applicator for use in an inventive cutting tool, the applicator being set up particularly for supplying fluid to a cutting edge of a cutting tool, especially to a cutting edge of the blade.

An advantage of the present invention is that the blade, which is acted upon with fluid by an applicator, has a lower friction with respect to a material being be cut by a cutting tool, since the fluid itself has a lower frictional resistance with respect to the surfaces of the material being cut and the surface of the blade of the cutting tool. In particular, the side surface of the blade has a relatively high friction with respect to the material being cut, and the fluid, during a cutting motion, prevents a blade, which is constantly penetrating further into the material being cut, from being retarded during the cutting motion.

The subject matter of subsequent claims relates to a metering device for activating and/or actuating an applicator, which has a housing, a lever arrangement and holding means.

In the following, configurations of the method, given by way of example embodiments, are described.

In accordance with a first embodiment of the method, the cutting edge of the blade is supplied with the fluid over the whole of its length.

This embodiment has the advantage that a uniform reduction in friction can be achieved by the fluid along the cutting edge of the blade.

In accordance with a further embodiment of the method, the fluid is transferred to the cut surface of the cut piece and/or to the material being cut by the blade during the cutting process, as a result of which the cut surface is acted upon at least partly with the fluid and, in particular, is wetted.

This embodiment has the advantage that the fluid is distributed by the material being cut in a simple manner over the whole surface of the blade.

In accordance with a further embodiment of the method, it is provided that the fluid is a liquid for activating vitamins in the material being cut, especially an oil or containing such an oil. Furthermore, it may likewise be provided that the fluid for cutting sugar-containing fruit contains a component which prevents oxidation of a cut surface of the fruit and, as a result, prevents browning.

This embodiment has the advantage that, for example, during the cutting of vegetables for preparing a salad, a cut surface is coated with an oil or the like by moving it along the blade, which has been acted upon by the fluid. This may result, for example, in the cut surface being sealed by the oil after it is severed and that the material cut is protected against oxidation or an excessive loss of water. Furthermore, when cutting meat with a cutting tool in the form of a kitchen knife, the blade may be pulled advantageously through the meat more easily because of the applied oil, which is advantageous, for example, when the meat is being browned.

Corresponding to a further embodiment of the method, a second fluid is supplied to the blade of the cutting tool. The second fluid may be identical to or different from the first, already-disclosed fluid. This embodiment has the advantage that two different fluids may be supplied, optionally from two separate applicators or from a common applicator, the two different fluids having a different effect on the cutting process and/or the cut material. Where the two fluids are supplied separately, an unintended mixing of the two fluids can be prevented. Furthermore it may, for example, be ensured that one fluid comes into contact with the material being cut before the other one, for example when one fluid is supplied in the region of the cutting edge and the other in the region of the blade behind it in the direction of cutting.

Some embodiments of the cutting tool are disclosed as follows.

In accordance with a first embodiment, the cutting tool is configured for carrying out the previously described inventive method. Accordingly, this embodiment has the same advantages as the method, which is carried out correspondingly.

In accordance with an embodiment, the cutting tool is designed in the form of a mandoline slicer, the basic body being a handle, which holds the blade. Furthermore, the blade preferably may be disposed at a front end of the handle of the kitchen knife. A cutting tool in the form of such a kitchen knife may be used for this purpose for cutting up in a defined manner the material to be cut, especially foods such as meat, bread and the like, but also fruit or vegetables.

This embodiment has the advantage that, during a cutting process, the kitchen knife can be held easily, preferably with one hand, especially at the handle, which is provided for this purpose, and the kitchen knife may be handled safely, as a result of which the danger of an injury to the user is minimized. The material, which is to be cut may, for example, be held with the other hand on a cutting support, while the cutting tool, in the form of a kitchen knife, is guided by a free movement with the other hand and the material to be cut is severed with the blade. The piece severed from the material being cut may subsequently be separated by a lateral movement from the material being cut and optionally tipped over onto the surface of the cutting support.

Corresponding to a further embodiment of the cutting tool, the tool is designed in the form of a mandoline slicer, which has a guiding surface on which the material to be cut, is moved back and forth and can be supplied to the blade in a controlled manner, the guiding surface being offset from the blade. This offset between the blade and the guiding surface defines the cutting thickness of the pieces, which are to be cut. In order to change the cutting thickness, it may, in embodiments, be provided that the position of the guiding surface relative to the blade is variable and/or can be adjusted by adjusting means. A cutting tool in the form of such a mandoline slicer can be used to cut up material such as fruit, vegetables and the like, in a defined manner. For more easily fixing it and guiding it reliably during a cutting process, the cutting tool may, in particular, have a handle. This handle preferably is connected with the basic body of the cutting tool and/or configured as part of the basic body.

Furthermore, in accordance with a further embodiment of the cutting tool in the form of a mandoline slicer, it may be provided that the blade is disposed transversely or at an angle to the main axis, particularly to a longitudinal axis of the mandoline slicer. Likewise, the blade may be formed in one piece in a V shape or by an arrangement of two V-shaped blades tapering in the cutting direction.

This embodiment has the advantage that, during a cutting process, the mandoline slicer, which preferably is held with one hand, particularly at the handle provided for this purpose and, with an end opposite to the handle, is supported on a support or the edge of a collection container, is held securely against slipping, as a result of which the cutting tool can be controlled better and the danger of injury to the user is minimized especially during a very rapid movement of the material being cut. The material to be cut preferably is moved back and forth on the guiding surface and supplied to the blade. For each movement of the material to be cut by the blade, a slice of the material is cut off and falls through a slot between the blade and the guiding surface.

In accordance with a further embodiment of the cutting tool, the basic body has an opening through which the fluid can be supplied. The opening, in embodiments, is a pipe which passes through the basic body from the top to the bottom, with an upper opening which leads directly to a channel running along the blade. There are several possibilities for arranging the opening. It is likewise conceivable that a plurality of openings for supplying several fluids and/or for supplying on opposite sides of the blade is provided. Accordingly, in the event that, for example, two fluids are applied, one opening may be provided for each fluid and disposed either next to one another on the same side of the blade or on opposite sides of the blade.

Particularly in the case in which two openings are disposed on one side of the blade next to one another, it may be intended that one fluid is applied in the region of the cutting edge of the blade and the other fluid in a region of the back of the blade, which is opposite to the cutting edge. Alternatively, provisions may also be made so that an opening is disposed on each of the opposite sides of the blade and that the same fluid is supplied through each.

This embodiment has the advantage that, due to the arrangement of the openings for supplying a fluid corresponding to one of the respective configurations described above, an advantageous distribution of the fluid supplied to the blade may be achieved. Likewise, in the case of two fluids, a fluid supplied in the region of the cutting edge may have an advantageous effect on the cutting process itself, whereas a second fluid which is supplied in the region of the back of the blade comes into contact with the material being cut only when the blade is coated and, consequently, can serve a different advantageous purpose.

According to a further embodiment of the cutting tool, the opening is formed at a surface of the basic body at a section adjacent to the blade. In embodiments, an opening for a fluid is disposed at one end of the blade, preferably the end of the blade connected to the basic body, and the fluid, emerging from the opening, reaches the corresponding side of the blade, on which it is distributed.

This embodiment has the advantage that, due to the controlled flow of the fluid through the opening, the distribution of the fluid along the cutting edge and/or on the side surface of the blade can be controlled.

According to a further embodiment of the cutting tool, the opening preferably is disposed at one end of the blade. This configuration has the advantage that, especially in the case of a blade disposed obliquely to a cutting direction, the fluid supplied to a front end of the blade can be distributed together with the cutting movement along the cutting edge of the blade.

In accordance with a further embodiment of the cutting tool, the basic body has a compartment, configured such that it is possible to introduce the applicator at least partly into the compartment. Advantageously, in order not to alter the external dimensions of the cutting tool, the compartment can be configured in such a manner that the applicator is accommodated fully in the compartment.

This embodiment has the advantage that the applicator can be connected to the basic body of the cutting tool; this can be done at little cost as a simple plug-in connection, and would not require any changes in the basic body, which could impede its function. For example, the applicator can be brought into the basic body, in particular into the compartment of the basic body, from a lower side away from the guiding surface.

According to a further embodiment of the cutting tool, the basic body and/or the applicator has and/or have holding means, in the form of latching elements, the holding means taking hold of the applicator and/or the basic body at least sectionally. In particular, it may be provided that the applicator can be connected preferably positively by clipping it to and/or into the basic body. It may likewise be intended that the holding means are disposed at an outer surface of the basic body, in order to fix the applicator to the basic body by plugging it in. Likewise, it is conceivable to dispose the holding elements in a compartment, which has been provided for this purpose, in order to prevent the applicator, which has been inserted into the compartment, from slipping out. This embodiment has the advantage that holding means may be made available at relatively little cost, with which a secure connection between the applicator and the basic body of the cutting tool can be created and by which the applicator is secured against shifting or even slipping out of the basic body.

According to a further embodiment of the cutting tool, a valve, by which the flow of fluid is adjusted, is disposed in the basic body or in the applicator or in a pipeline, which is disposed in between, or in a pipeline connected to the applicator.

Within the meaning of the invention, a "valve" preferably means a device for adjusting a control parameter, especially of a flow rate and/or of a passage of a medium. Adjusting the flow rate refers particularly to blocking, as well as to throttling and or limiting the control parameter. This embodiment has the advantage that the amount of fluid supplied can be adjusted via the valve, in order to ensure a constant replenishment of fluid as a function of the cutting speed.

According to a further embodiment of the cutting tool, the valve has a final control element, which is mounted so that it can be rotated about an axis. Within the meaning of the invention, a "final control element" preferably describes a part of a valve for regulating a flow rate or throughput, especially the part which exerts a physical effect on the control variable. For example, the final control element may be constructed as a rotary cylinder with a groove, which extends partly along the periphery. The rotary cylinder may be rotated by means of a lever or adjusting wheel and, because of a changing cross-section of the groove, can adjust the cross-section of the pipeline between an inlet opening and an outlet opening.

This embodiment has the advantage that, because a valve with a final control element that can be rotated about an axis is provided, valves, which can save space and can be adjusted precisely, can be installed. Moreover, the cross-section of the opening of the valve can be adjusted very precisely.

In accordance with a further embodiment of the cutting tool, the valve can be adjusted by means of an adjusting device, especially a lever and/or an adjusting wheel. In particular, provisions can be made so that the adjusting device is connected with the valve so as to be accessible from the outside.

This embodiment has the advantage that the valve can be operated easily by means of the adjusting device. Likewise, it may be of advantage if the setting of the adjusting device can be altered between two cutting processes, so that the amount of fluid flowing through may be adjusted.

In accordance with a further embodiment of the cutting tool, the valve can be adjusted infinitely variably. This embodiment has the advantage that it becomes possible to adjust the valve particularly finely.

In accordance with a further embodiment of the cutting tool, the applicator or the basic body has a pouch for storing fluid, especially a pouch which is manufactured at least partly from silicone. This embodiment has the advantage that, once again, the required space for providing the valve can be reduced. This is of advantage particularly if the valve is designed as part of the applicator.

Embodiments of the applicator are described in the following.

In accordance with a first embodiment, the applicator is designed as an attachment and/or as an exchangeable insert. This embodiment has the advantage that the applicator may be adapted to a corresponding form of the cutting tool and mounted in such a manner that the basic body of the cutting tool is mounted and/or inserted in the basic body so that it does not impede the cutting process, especially during a cutting movement.

In accordance with a further embodiment of the applicator, the applicator has a reservoir for the fluid, especially a pouch, preferably made at least partly from silicone. In embodiments, this reservoir is exchangeable and designed, for example, in the form of a cartridge. Moreover, it may be advantageous that the applicator has a pressure-producing device, which is designed, for example, in the form of a compression spring acting from outside on a part of the reservoir, especially on a piston-like bottom section. This embodiment has the advantage that the reservoir may be adapted in size and capacity such that the fluid can optionally be accommodated in a compartment of the basic body intended for this purpose and, at the same time, preferably provide a large supply of fluid. Furthermore, this embodiment has the advantage that, due to the use of silicone or an equivalent plastic, the required purity according to food hygiene regulations can be maintained.

In accordance with a further embodiment, the applicator has a metering device and/or a pump, which is disposed integrally, particularly in the applicator. Within the meaning of the invention, "integrally disposed" can generally be understood to mean that the metering device or pump is disposed within the applicator, which is designed, for example, as an insertable component. In other words, the metering device or pump preferably can be an exchangeable component of the applicator. The pump may be a pump operated personally by the user and/or an electromechanical pump. Furthermore, any conceivable mechanism may serve for this purpose, in order to convey the fluid from a reservoir to the opening. Furthermore, it is conceivable that the reservoir for the fluid is designed in the form of a hollow cylinder with a piston-like wall, which lies opposite to the outlet opening and functions according to the principle of a syringe or a cylinder piston. Likewise, an embodiment is conceivable in which the fluid in the reservoir is exposed to pressure and can be discharged from the reservoir in a controlled manner, merely by means of a metering device.

This embodiment has the advantage that the desired or required fine adjustability of, for example, the flow rate of the fluid can be provided by the configuration selected for the conveying mechanism of the applicator.

In accordance with a further embodiment of the applicator, the pump conveys either the fluid or a medium, which is intended to enter into an operative connection with the fluid.

For example, in the event that the reservoir is in the form of a flexible pouch, it may be provided that the pump conveys the fluid out of the pouch under the action of a suction effect, or forces the fluid out of the pouch by means of a further fluid medium, such as air, exerting pressure on the pouch from the outside. This embodiment has the advantage that the conveying rate of the fluid can be controlled by simple means, even as a function of the flow behavior of the respective fluid.

In accordance with a further embodiment of the applicator, the applicator has a supply pipeline which connects the reservoir with an outlet opening for the fluid. Furthermore, the reservoir can be configured as a container that is spatially separated from the applicator and preferably connected to the applicator by means of a connecting pipeline.

In addition, an arrangement of an electrically operated pumping device, for example, in a section of the supply line, may be of advantage. By these means, the valve may, for example, be designed together with the pumping device so that the amount of fluid flowing through can be controlled manually and also electronically. This embodiment has the advantage that large capacity reservoirs, which because of their weight or dimensions cannot be accommodated within the applicator or in the basic body attached to the latter, can also be used.

Embodiments of the metering device are described in the following.

In accordance with a first embodiment of the metering device, a lever device is set up for acting upon the applicator for actuating an outlet valve of the applicator at least partly with a compressive force. Preferably, the applicator can be compressed at least partly by the compressive force, as a result of which an outlet valve, for example, at the head of the applicator, can be actuated. An applicator in the form of a packaging and/or a dispenser of DE 43 33 627 is/are particularly suitable for this purpose. The compressive force preferably brings about a slight compression, especially a relative pressing together of the applicator and the outlet valve.

This embodiment has the advantage that a particularly easy and fine metering of the amount of fluid delivered from the applicator can be carried out. Furthermore, because of the lever arrangement, it is necessary to use only a slight force for actuating the lever arrangement, such as only using one or two fingers.

In accordance with a further embodiment of the metering device, the body of the housing can be connected, by means of a connecting pipeline, with an outlet opening, which is disposed at the basic body of a cutting tool. This embodiment has the advantage that, by means of the metering device, applicators with a reservoir of several hundred milliliters can also be used and placed separately in the immediate surroundings of the cutting tool.

In accordance with a further embodiment of the metering device, the housing body can be attached to a basic body of a cutting tool. This configuration has the advantage that the cutting tool may be connected with a metering device to form a single, easy to handle unit. By these means, the lever arrangement of the metering device can be within range of the hand, especially the holding hand, of the user of the cutting tool and can easily be actuated in this way.

In the following, the invention is described in greater detail by means of the Figures.

Figure 2:
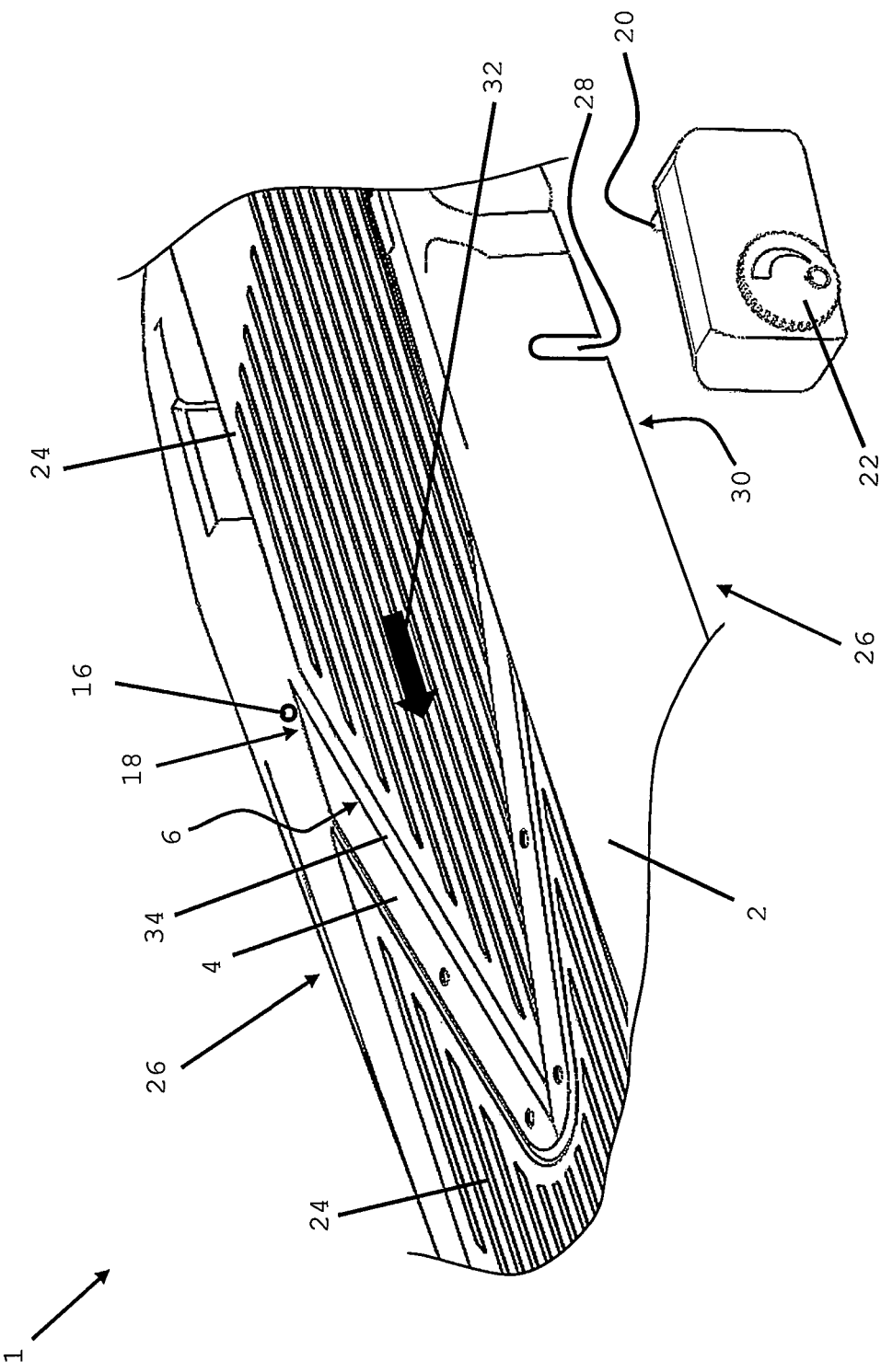
Figure 3A:
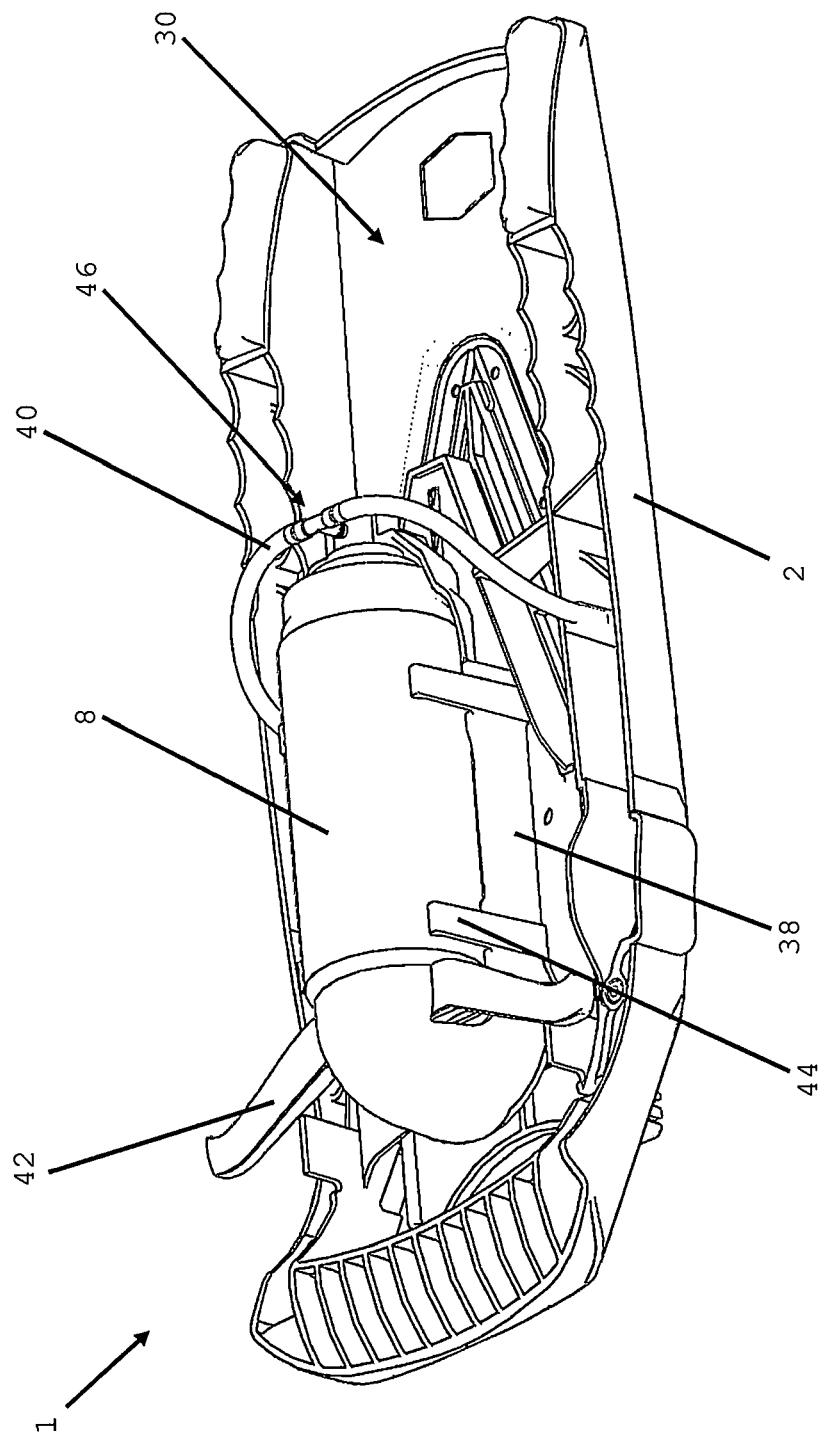
Figure 3B:
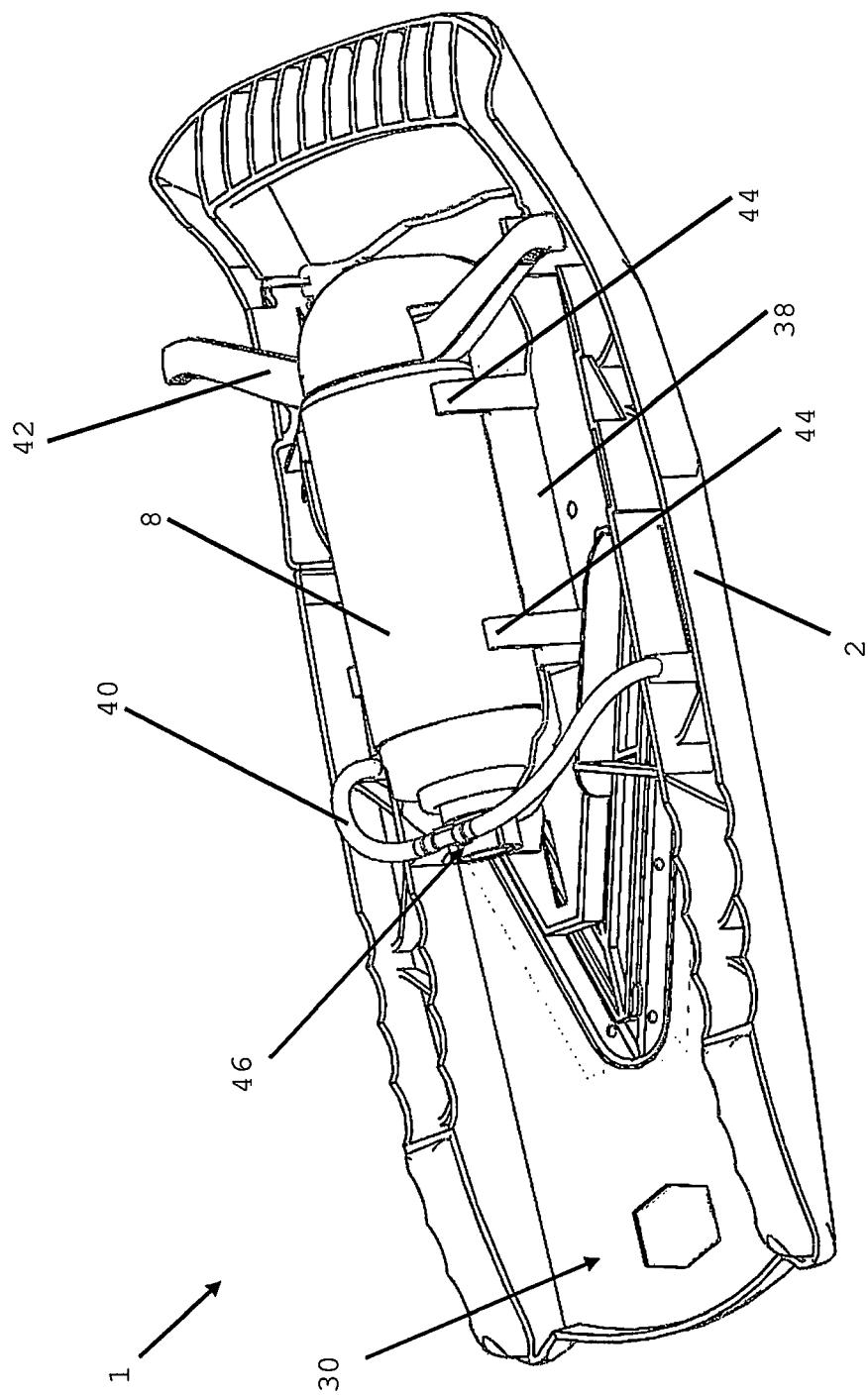
Figure 3C:
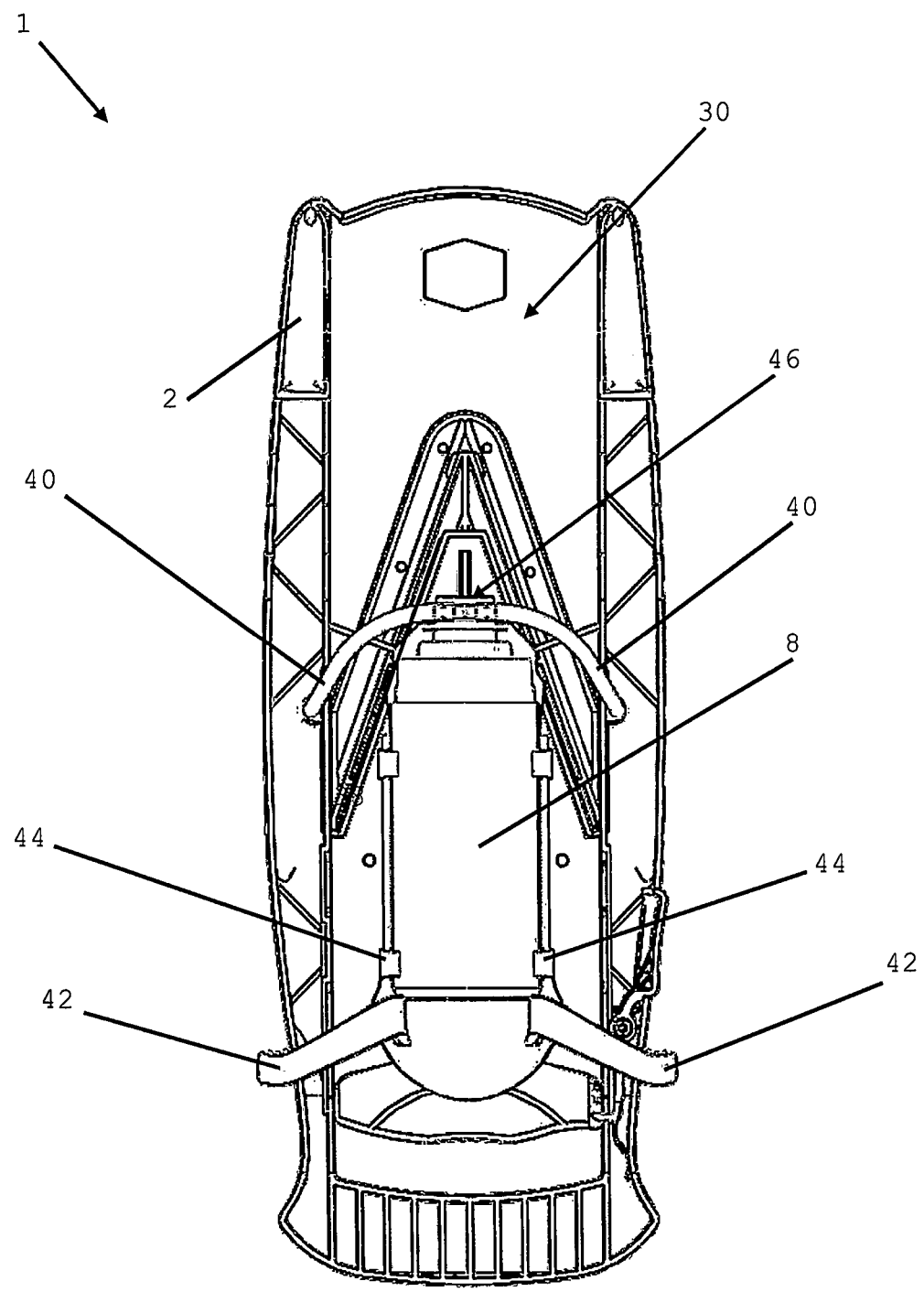
Figure 4A:
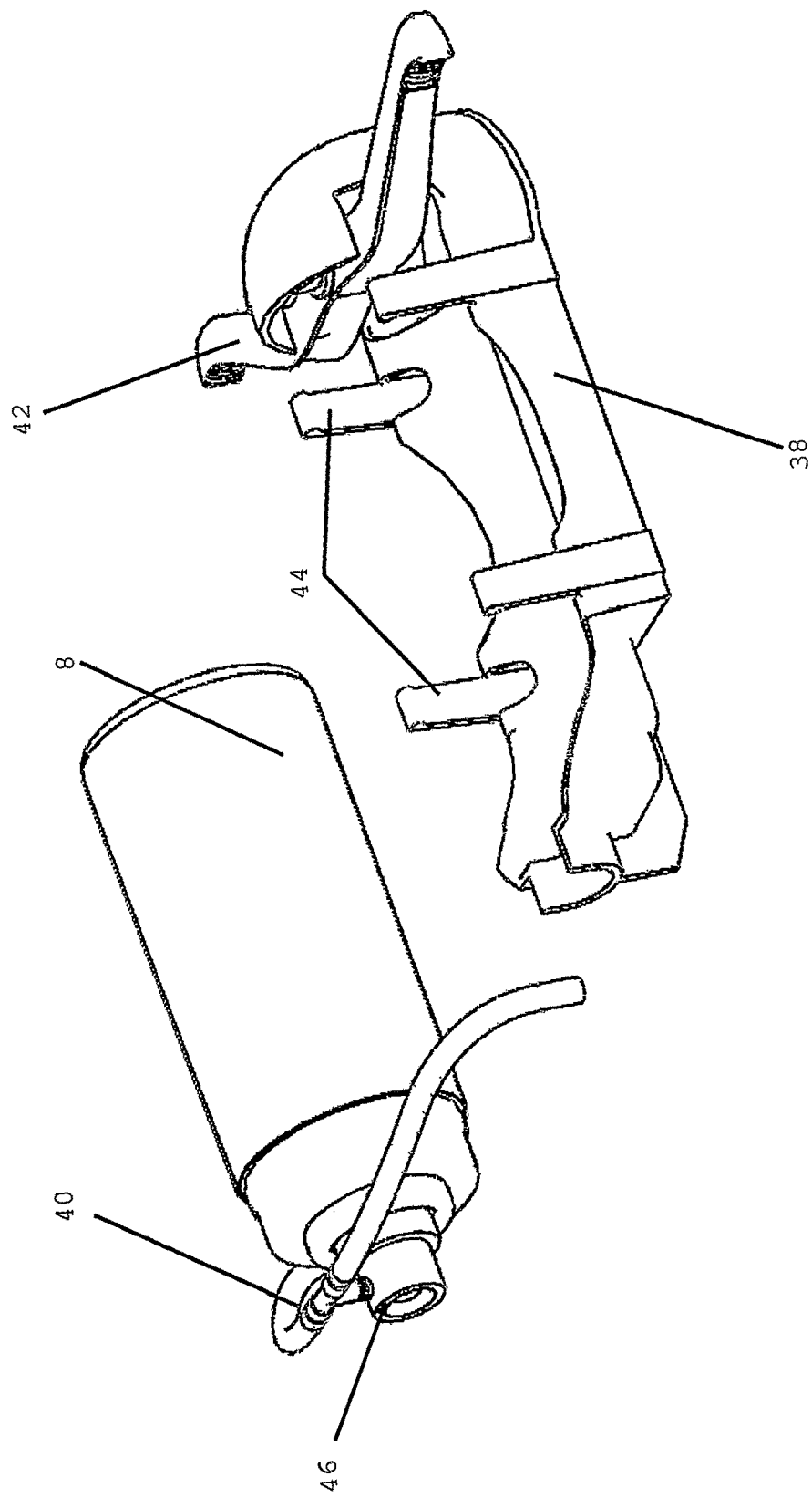
Figure 4B:
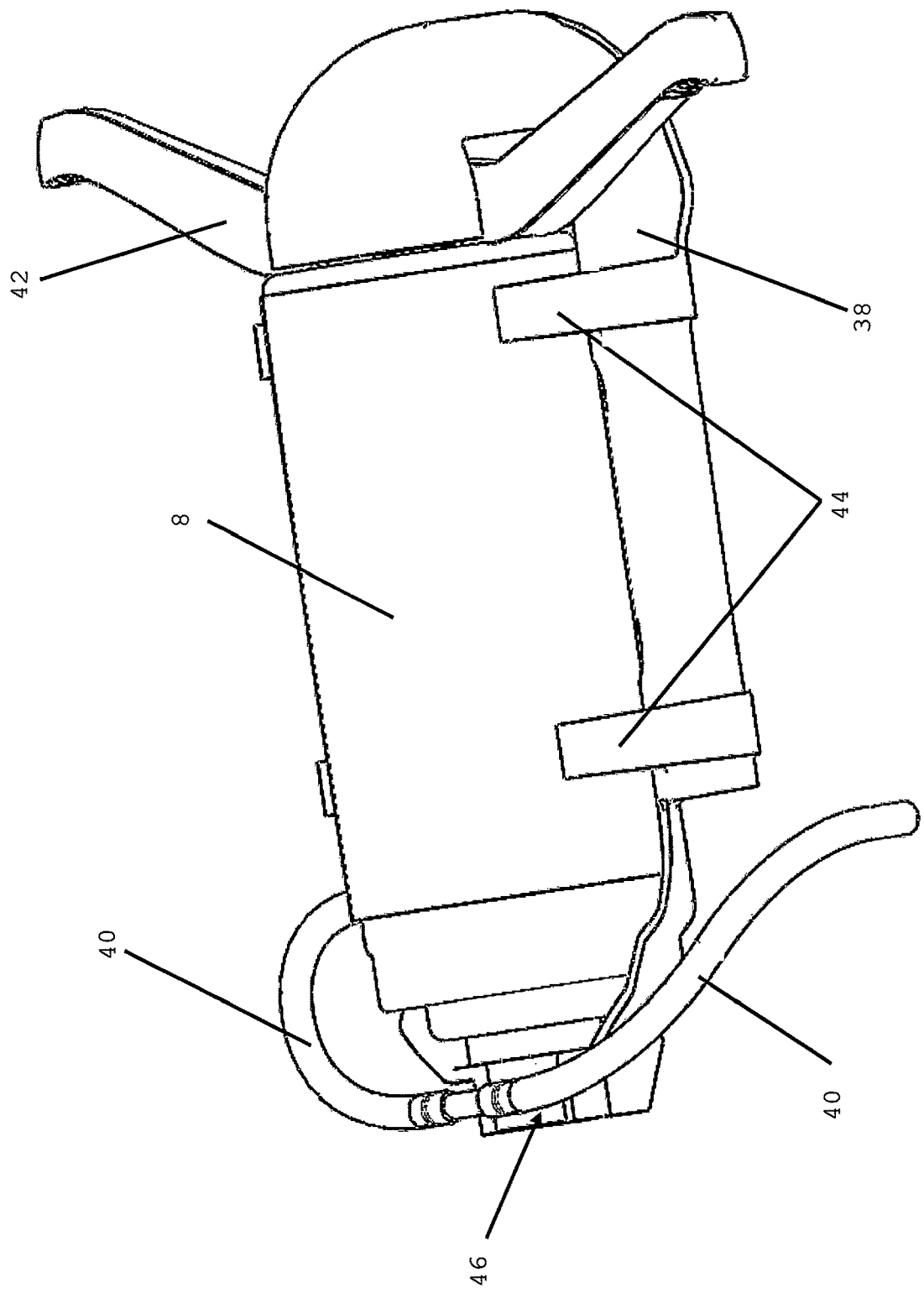

FIG. 1 shows a view of a proposed cutting tool embodiment of the invention,

FIG. 2 shows a view of a proposed cutting tool of a further possible embodiment of the invention, FIG. 3a shows a perspective view of a possible embodiment of a proposed cutting tool with a metering device and an applicator, FIG. 3b shows a further perspective view of the subject matter of FIG. 3a from a different viewing angle, FIG. 3c shows a further view of the subject matter of FIGS. 3a and 3b from below, FIG. 4a shows a perspective view of a possible embodiment of a proposed metering device and an applicator in which they are separated from one another, and FIG. 4b shows the metering device and the applicator of FIG. 4a in the assembled state.

Before configurations of the invention are described in greater detail below, it should first of all be noted that the invention is not limited to the components described or to the steps of the method described. Furthermore, the terminology used also does not represent a limitation and, instead, is merely exemplary in character. In so far as the singular form is used in the specification and the claims, this also in all cases includes the plural form, provided that the context does not explicitly exclude this.

The individual Figures of this application are to be regarded merely as diagrammatic and not as being true to scale.

FIG. 1 shows a diagrammatic view of a proposed cutting tool embodiment of the invention.

Moreover, FIG. 1 shows a cutting tool 1 in the form of a kitchen knife for cutting material to be cut. The cutting tool 1 has a basic body 2, which preferably extends in length and serves as a holding handle. A blade 4, which has a cutting edge 6 in order to cut pieces from the material to be cut, is disposed in the extension of the basic body 2. The cutting tool 1 furthermore has an applicator 8, the applicator 8, being configured for supplying a fluid to the blade 4, especially the cutting edge 6 of the blade 4. As can furthermore be inferred from the figure, the applicator 8 is designed as an attachment and is disposed at the front end 10 of the basic body 2 opposite to the blade 4. Furthermore, for supplying fluid, the applicator 8 has a reservoir for the fluid, which is not shown for technical reasons. For the embodiment of the cutting tool shown, the applicator 8, at its end, which is in contact with the basic body 2, has an outlet opening 20, which is designed as a connecting piece. Through this, the fluid is delivered from the applicator 8 to the cutting tool 1 for being passed on to the blade 4. For the embodiment shown, a conducting channel, which is not shown, preferably is disposed in the basic body 2 and connects the outlet opening 20 with the opening 16 in the basic body 2.

FIG. 1 furthermore shows that the applicator 8, after it is connected to the front end 10 of the basic body 2, is held by holding means 12, which interlock with the holding grooves 14, which are provided at the applicator 8. The holding means 12, together with the holding grooves 14, are configured for preventing the applicator 8 from detaching and for preventing the contact surface between the applicator 8, and the basic body 2 from tilting. The basic body 2 furthermore has an opening 16, through which the fluid is supplied to the blade 4. The opening 16 is formed at a surface of the basic body 2, preferably at a section contacting an end 18 of the blade 4.

Moreover, adjustment means 22 is shown in the form of an adjusting wheel at the applicator 8.

The adjustment means 22 acts upon a valve, which is disposed in the interior of the applicator 8 and is not shown, and can be adjusted infinitely. The valve serves for adjusting a flow rate of the fluid and consequently also the amount of fluid supplied to the blade 4.

FIG. 2 shows a diagrammatic view of a proposed cutting tool embodiment of the invention.

FIG. 2 shows a cutting tool 1 in the form of a mandoline slicer for cutting materials. The cutting tool 1 further has a guiding surface 24, on which the material to be cut is moved back and forth and supplied to the blade 4 in a controlled manner. The blade 4 is shown as having a V shape, which is open counter to the direction of cutting 32. It is, however, also conceivable that a blade 4 has a simple cutting edge 6, which is disposed obliquely. As can furthermore be inferred from the representation in detail, the guiding surface 24 is disposed offset with respect to the blade 4 with the formation of a gap 34. This gap 34 defines the thickness of the piece cut off from the material. Furthermore, for the embodiment shown, the applicator 8 has a laterally disposed outlet opening 20. Furthermore, it is intended that the applicator 8 is pushed from a lower side 30 into a compartment, which has not been numbered and is provided in the basic body 2. For this purpose, a recess 28 is provided at the longitudinal side 26 of the basic body 2. This recess 28 fits around a connection, which is not shown, between the adjustment means 22 and the valve, so that the applicator 8 is accommodated in the interior of the basic body 2 and so that the adjustment means 22 continues to be accessible from the outside. In an alternative embodiment, at the lower side 30, the adjustment means 22 protrudes beyond the wall of the basic body 2 at the longitudinal side 26 thereof and is accessible from the lower side 30.

When the applicator 8 is inserted in the basic body 2, the outlet opening 20 preferably is aligned with the opening 16 in the basic body 2, which is provided at the corresponding longitudinal side 26. For the cutting tool 1 portrayed, it may be assumed that, for the opening 16 portrayed here, an applicator 8, which is disposed back-to-front and not shown in FIG. 2, is provided. Likewise, an opening 16, which co-operates with the applicator 8 shown, is not visible on the corresponding longitudinal side 26 of the basic body 2 and therefore has not been shown.

It is emphasized that a pump is not required in the event (not shown) that the pouch in the applicator comprises silicone. Silicone pouches, the use of which is preferred, are stretched when filled, the tension being relieved under the control of a metering device during the emptying process.

Each of the FIGS. 3*a* and 3*b* and 3*c* shows a perspective view of a possible embodiment of a proposed cutting tool 1 with a metering device 36 and an applicator 8 from different viewing angles.

The cutting tool 1, shown in FIGS. 3*a* and 3*b* and 3*c*, is portrayed in the form of a mandoline slicer, on the underside of which a metering device 36 is fastened for activating and/or actuating an applicator 8, which is disposed at the metering device 36. For accommodating the applicator 8, the metering device 36 has a housing body 38, at which a lever arrangement 42 and holding elements 44 are disposed. The holding elements 44 preferably serve for holding an inserted applicator 8 and securing it against unintentionally slipping out. The lever arrangement 42 serves to actuate the applicator 8, which, in particular, means an activation and metering of the fluid delivered. For this purpose, the lever arrangement 42 preferably is configured to act at least partly with a compression force on the applicator 8 actuating an outlet valve 46 of the applicator 8.

FIGS. 4*a* and 4*b* show perspective views of an embodiment of a proposed metering device 36 and an applicator 8. In FIG. 4*a* the metering device 36 and applicator 8 are shown separated from one another and in FIG. 4*b* they are shown in an assembled state.

The metering device 36, shown in FIGS. 4*a* and 4*b*, has a connecting pipeline 40, with which the housing body 38 can be connected with an outlet opening 20, which is disposed at the basic body 2 of a cutting tool 1. Furthermore, the applicator 8 of FIG. 4*a* can be inserted in and especially clipped via the holding elements 44 of the housing body 38 of the metering device 36. The metering device 36 with the inserted applicator 8 is shown in FIG. 4*b*.

In accordance with a method for cutting fruit, vegetables or the like, a fluid is supplied to a blade 4 of a cutting tool 1, preferably to the cutting edge 6 of the blade 4. The advantage thereby achieved is to reduce the friction between the blade 4, which is acted upon with the fluid, and the material being cut, since the fluid itself has a lower frictional resistance with respect to the surface of the material being cut and the surface of the blade 4. The side surface of the blade 4 has a relatively high friction with respect to the material being cut and, during a cutting process, the fluid prevents retardation of the cutting motion as the blade 4 constantly penetrates further into the material being cut.

Furthermore, in embodiments, the cutting edge 6 of the blade 4 is supplied with the fluid over the whole of its length. This has the advantage of uniformly reducing friction along the cutting edge 6 of the blade 4.

Furthermore, in embodiments, while a portion of the material is being cut off, fluid is transferred by the blade 4 onto the cut surface of the piece cut off and/or transferred to the cut material, whereby the fluid acts upon and wets at least part of the cut surface. The advantage achieved here is that the fluid can be distributed easily by the material cut over the whole surface of the blade 4.

In accordance with the method, in embodiments, the fluid is or contains a liquid, especially an oil, for activating vitamins in the material cut. Furthermore, in embodiments, the fluid for cutting sugar-containing fruit contains a component, which prevents oxidation and therefore browning of the cut surface of the fruit. By these means, for example, when vegetables are being cut for the preparation of a salad, a cut surface of the material being cut is coated with an oil or the like by being pulled along the blade 4, which has been coated with the fluid. This may, for example, lead to the cut surface being sealed with oil after the severing, and the cut material being protected against oxidation or an excessive loss of water. Furthermore, when cutting meat with a cutting tool 1 in the form of a kitchen knife, due to the oil applied, the blade 4 can advantageously be pulled more easily through the meat and the meat receives an application of oil at the cut surfaces, which can be advantageous, for example, when browning the meat.

Moreover, in embodiments, a second fluid is supplied to the blade 4 of the cutting tool 1. The second fluid may be identical to or different from the first already named fluid. It is of advantage here that, in embodiments, two different fluids may be supplied, if necessary, from two separate applicators 8, or one common applicator 8, and the two fluids can each have a different effect on the cutting process and/or the material cut. An undesirable mixing of the two fluids can be prevented by providing and/or stocking the two fluids separately. Moreover, it may likewise be ensured that the one fluid makes contact with the cut material before the other fluid, for example when one fluid is supplied to the region of the cutting edge 6 and the other fluid to the region of the blade 4, which lies behind.

The invention claimed is:

1. An improved mandoline kitchen slicer for manually cutting fruits and vegetables, said kitchen slicer having (i) a base body, (ii) a guide surface on which the fruits and vegetables are manually moved to and fro, (iii) a blade connected to the base body and having a cutting edge and arranged offset in relation to said guide surface so as to form a gap between the guide surface and the cutting edge for manually cutting slices from the fruits and vegetables when they move across the cutting edge of the blade, wherein the offset between said blade and said guide surface determines thickness of the slices cut from the fruits and vegetables, and (iv) an applicator designed to supply an edible fluid to the cutting edge of the blade, and wherein the base body has (a) a compartment in the base body and below the blade, said compartment having space to receive the applicator and has (b) holding elements to retain the applicator in the base body, and wherein the applicator has a reservoir for storing a supply of the edible fluid, and a pump for supplying a portion of the edible fluid from the applicator to a region proximate the cutting edge of the blade.

2. An improved mandoline kitchen slicer according to claim 1, wherein the base body has a top, a bottom, an opening from top to bottom of the base body, the opening disposed proximate to the blade, a conduit, and a trough running along the blade, and the applicator further comprising an outlet and a conduit, the conduit connecting the outlet of the applicator to the opening at the top of the base body.

3. An improved mandoline kitchen slicer according to claim 2 wherein the opening is disposed at one end of the stationary blade.

4. An improved mandoline kitchen slicer according to claim 1, wherein the holding elements comprise one or more latching elements.

5. An improved mandoline kitchen slicer to cut fruits and vegetables, said kitchen slicer having a base body, a guide surface on said base body for supporting fruits and vegetables moved to and fro on the guide surface, a blade connected to the base body, having a cutting edge and arranged offset in relation to said guide surface so as to form a gap between the guide surface and the cutting edge for cutting fruits and vegetables moved on said guide surface to and fro across said blade, wherein the offset between said blade and said surface determines thickness of slices cut from the fruits and vegetables, and (iv) applicator having (i) a reservoir for storing a predetermined supply of edible fluid, (ii) a pump, and (iii) a supply line for supplying a portion of the edible fluid from the applicator to a region proximate the cutting edge of the blade, and a compartment in the base body below the blade, said compartment having space to receive the applicator and having holding elements to hold the applicator in the base body.

6. An improved mandoline kitchen slicer according to claim 5, wherein the base body has a top, a bottom, a trough running along the blade, and an opening from top to bottom for receiving the supply line through which the fluid is fed into the trough running along the blade.

7. An improved mandoline kitchen slicer according to claim 6, wherein the opening is configured through the base body adjacent one end of the blade.

8. An improved mandoline kitchen slicer to slice fruits and vegetables, the kitchen slicer comprising:
a base body having an elongated main axis and a pair of opposite longitudinal sides spaced apart,
a guide surface on which the fruits and vegetables are manually moved to and fro;
a blade connected to the base body and disposed transversely at an angle to the main axis, the blade having a cutting edge and arranged offset in relation to the guide surface so as to form a gap between the guide surface and the cutting edge for cutting fruits and vegetables moved on the guide surface to and fro across the blade, wherein the offset between the blade and the guide surface determines thickness of slices cut from the fruits and vegetables;
an opening in the base body, the opening disposed proximate to the blade for carrying fluid to the cutting edge of the blade;
a trough extending from the opening and running along the blade for distributing fluid along the cutting edge;
a compartment in the base body disposed below the blade;
an applicator disposed in the compartment below the blade, the applicator having a reservoir, a pump and a conduit, the reservoir for holding a supply of edible fluid, the reservoir and the pump integral with the applicator, and the conduit extending from an outlet of the applicator to the opening in the base body for carrying fluid to the blade; and
holding elements disposed in the compartment between the applicator and the lower side of the guide surface for holding the applicator in the base body.

9. An improved mandoline kitchen slicer for manually cutting fruits and vegetables, said kitchen slicer having (i) a base body, (ii) a guide surface on which the fruits and vegetables are subjected to contact pressure for moving to and fro, (iii) a blade connected to the base body and having a cutting edge and a frictional surface for generating a frictional force resisting to and fro motion of the fruits and vegetables across the frictional surface of the blade in proportion to contact pressure applied to the fruits and vegetables, said blade arranged offset in relation to said guide surface so as to form a gap between the guide surface and the cutting edge for manually cutting slices from the fruits and vegetables when they move across the cutting edge of the blade, wherein the offset between said blade and said guide surface determines thickness of the slices cut from the fruits and vegetables, and (iv) an applicator designed to supply an edible fluid to the cutting edge of the blade for reducing the coefficient of friction between the frictional surface of the blade and the fruits and vegetables as the fruits and vegetable move to and fro over the frictional surface of the blade, and wherein the base body has (a) a compartment below the blade, said compartment having space to receive the applicator and has (b) holding elements to retain the applicator at the base body, and wherein the applicator has a reservoir for storing a supply of the edible fluid and a pump for supplying a portion of the edible fluid from the applicator to a region proximate the cutting edge of the blade.

* * * * *